United States Patent
Liu et al.

(10) Patent No.: US 11,449,837 B2
(45) Date of Patent: Sep. 20, 2022

(54) MAINTENANCE EQUIPMENT MANAGEMENT METHOD, SYSTEM AND DATA MANAGEMENT SERVER

(71) Applicant: LAUNCH TECH CO., LTD., Guangdong (CN)

(72) Inventors: Jun Liu, Guangdong (CN); Xin Liu, Guangdong (CN); Rijun Xiao, Guangdong (CN)

(73) Assignee: LAUNCH TECH CO., LTD., Guangdong (CN)

(*) Notice: Subject to any disclaimer, the term of this patent is extended or adjusted under 35 U.S.C. 154(b) by 1086 days.

(21) Appl. No.: 16/060,885

(22) PCT Filed: May 30, 2018

(86) PCT No.: PCT/CN2018/089043
§ 371 (c)(1),
(2) Date: Jun. 8, 2018

(87) PCT Pub. No.: WO2019/227344
PCT Pub. Date: Dec. 5, 2019

(65) Prior Publication Data
US 2020/0294002 A1    Sep. 17, 2020

(51) Int. Cl.
*G06Q 40/00* (2012.01)
*G06Q 10/00* (2012.01)
(Continued)

(52) U.S. Cl.
CPC ......... *G06Q 10/20* (2013.01); *G06F 16/1834* (2019.01); *G06Q 20/382* (2013.01); *G06Q 40/04* (2013.01); *G06Q 40/06* (2013.01)

(58) Field of Classification Search
CPC ...... G06Q 10/20; G06Q 20/382; G06Q 40/04; G06Q 40/06; G06F 16/1834
See application file for complete search history.

(56) References Cited

U.S. PATENT DOCUMENTS 10,810,673 B1 * 10/2020 Prasad .................. G06Q 40/06
10,891,694 B1 *  1/2021 Leise ................... G08G 1/0116
(Continued)

FOREIGN PATENT DOCUMENTS

CN    106960594 A    7/2017
CN    107563846 A    1/2018
(Continued)

OTHER PUBLICATIONS

Ya et al: "An application of Blockchain and Smart Contracts for Machine-to-Machine Communications in Cyber-Physical Production Systems", 2018 IEEE Industrial Cyber-Physical Systems (ICPS), Conference Location: St. Petersburg, Russia; Date of Conference: May 15-18, 2018 (Year: 2018).*

*Primary Examiner* — Edward J Baird
(74) *Attorney, Agent, or Firm* — Hamre, Schumann, Mueller & Larson, P.C.

(57) ABSTRACT

The present application discloses a maintenance equipment management method, maintenance equipment management system and data management server, this method comprises: receiving, via a data management server, a transaction request of using a maintenance equipment from a first user and calling a usage smart contract to grant a permission of usage of the maintenance equipment to the first user according to the transaction request; calling the usage smart contract to send a transaction payment request to the first user according to transaction information when the first user finishes using the maintenance equipment; performing a sharing according to the transaction sharing rule via the data management server when the payment transaction is finished by the first user; and receiving the transaction information submitted by the data management server and registering the transaction information in a block chain via the block chain node device.

10 Claims, 6 Drawing Sheets

(51) Int. Cl.
  *G06F 16/182*  (2019.01)
  *G06Q 20/38*  (2012.01)
  *G06Q 40/04*  (2012.01)
  *G06Q 40/06*  (2012.01)

(56) References Cited

U.S. PATENT DOCUMENTS

| | | |
|---|---|---|
| 2016/0210617 A1 | 7/2016 | Leger |
| 2017/0103468 A1* | 4/2017 | Orsini .................... H04L 9/3239 |
| 2018/0096175 A1* | 4/2018 | Schmeling ............. G06Q 10/08 |
| 2018/0225629 A1* | 8/2018 | Brodersen .......... G06Q 10/0875 |
| 2018/0247258 A1* | 8/2018 | Kolb ...................... G06Q 10/10 |
| 2018/0300741 A1* | 10/2018 | Leonard ................ G06Q 30/08 |
| 2018/0365686 A1* | 12/2018 | Kondo ................. G06Q 20/382 |
| 2021/0256007 A1* | 8/2021 | Wu ..................... G06F 16/2379 |

FOREIGN PATENT DOCUMENTS

| | | | |
|---|---|---|---|
| CN | 107798532 A | 3/2018 | |
| CN | 107977713 A | 5/2018 | |
| EP | 3116294 A1 * | 1/2017 | ............. G06Q 10/20 |
| WO | WO-2019161936 A1 * | 8/2019 | ......... G06F 16/1824 |

\* cited by examiner

MAINTENANCE EQUIPMENT MANAGEMENT METHOD, SYSTEM AND DATA MANAGEMENT SERVER

TECHNICAL FIELD

The present application pertains to the technical field of communication, and particularly to a maintenance equipment management method, a maintenance equipment management system and a data management server.

BACKGROUND

With the progress of the society, there are more and more products used for providing various services for the people. When a product that provides service for the people malfunctions, the product that malfunctions needs to be repaired using various maintenance equipment in a maintenance equipment.

In the current maintenance industry, a maintenance equipment is established by investors by purchasing a lot of maintenance equipment, and then by purchasing or renting a site, and by hiring fixed working staff (e.g., a maintenance technician and a manager) to carry out maintenance and management in the established maintenance equipment, the maintenance equipment can only be used by fixed maintenance technicians in the maintenance equipment; when there are many customers, these customers need to queue up and wait for the fixed maintenance technicians, such that the fixed maintenance technicians in the maintenance equipment can't use a plurality of maintenance equipment in the maintenance equipment to provide maintenance service simultaneously, an idle time of the maintenance equipment is long, and thus a service efficiency of the maintenance equipment is low. When the investment party is a single party, a large amount of maintenance equipment need to be purchased, the investment amount of the maintenance equipment is large, and the investment threshold of the investment party is high. If lots of investment parties make investments on the maintenance equipment, the income sharing management has a non-transparency, which results in a passive enthusiasm of the investors; moreover, the management of charging is non-transparent, customers are suspicious of whether the management of charging is reasonable, so that the credibility of merchants from customer perspective may be reduced.

Technical Problem

In view of this, embodiments of the present application provide a maintenance equipment management method, a maintenance equipment management system and a data management server, which aims at improving a service efficiency of a maintenance equipment and increasing a transparency of management of the maintenance equipment, such that investors are encouraged to make investments, and consumer demands of consumers are met better.

Technical Solution

In a first aspect, the present application provides a maintenance equipment management method comprising:

receiving via a data management server a transaction request of using the maintenance equipment from a first user, and calling a usage smart contract to grant a permission of usage of the maintenance equipment to the first user according to the transaction request; wherein the usage smart contract comprises a usage agreement, a charging rule and a transaction sharing rule of the maintenance equipment; calling, via the data management server, the usage smart contract to send a transaction payment request to the first user according to transaction information when the first user finishes using the maintenance equipment; performing a sharing according to the transaction sharing rule via the data management server when the first user finishes using the maintenance equipment; and receiving the transaction information submitted by the data management server and registering the transaction information in a block chain via a block chain node device.

In a second aspect, the present application provides a maintenance equipment management method, the management method is applied in a data management server and comprises: receiving a transaction request of using maintenance equipment from a first user, and calling a usage smart contract to grant a permission of usage of the maintenance equipment to the first user according to the transaction request; wherein the usage smart contract comprises a usage agreement, a charging rule and a transaction sharing rule of the maintenance equipment; calling the usage smart contract to send a transaction payment request to the first user according to transaction information when the first user finishes using the maintenance equipment; performing a sharing according to the transaction sharing rule when the payment transaction is finished by the first user; and sending the transaction information to a block chain node device, so that the block chain node device registers the transaction information in a block chain.

Based on the second aspect, in a first possible implementation mode, before receiving the transaction request of using the maintenance equipment from the first user, the method further comprises: receiving a maintenance equipment usage agreement submitted by a second user, and sending the usage agreement to the block chain node device, so that the block chain node device generates the usage smart contract according to the usage agreement and registers the usage smart contract in the block chain.

Based on the first possible implementation mode of the second aspect, in a second possible implementation mode, before receiving the maintenance equipment usage agreement submitted by the second user, the method further comprises: receiving investment cost information submitted by the second user; obtaining maintenance equipment information that matches with the investment cost information from the block chain node device according to the investment cost information; generating an investment scheme of the maintenance equipment according to the maintenance equipment information and the site information that match with the investment cost information; and sending the investment scheme of the maintenance equipment to the second user.

Based on the second possible implementation mode of the second aspect, in a third possible implementation mode, before receiving the transaction request of using the maintenance equipment from the first user, the method further comprises: receiving maintenance equipment information and investment cost information of the maintenance equipment submitted by the second user, storing the maintenance equipment information and the investment cost information in association, generating digital asset information and sending the digital asset information to the block chain node device, so that the block chain node device registers the digital asset information in the block chain.

Based on the second aspect, or based on the first implementation mode, the second implementation mode or the third implementation mode of the second aspect, in a fourth possible implementation mode, after sending the transaction information to the block chain node device, the method further comprises: calculating return on investment according to the transaction information and the investment cost information, and sending return on investment to the block chain node device.

Based on the fourth possible implementation mode of the second aspect, in a fifth possible implementation mode, the method further comprises: receiving a financing agreement submitted by the second user, and sending the financing agreement to the block chain node device, so that the block chain node device generates a financing smart contract according to the financing agreement; wherein the financing smart contract comprises a financing rule and a financing income sharing rule; receiving financing amount information submitted by a third user; and calling the financing smart contract to calculate return on investment of the third user according to the financing amount information, and sending return on investment to the third user.

Based on the second aspect, or based on the first implementation mode, the second implementation mode or the third implementation mode of the second aspect, in a sixth possible implementation mode, the method further comprises: detecting whether the maintenance equipment is in an initial state after the first user finishes the payment transaction; wherein the initial state is the state of the maintenance equipment before the first user uses the maintenance equipment; and determining that the maintenance equipment is in an abnormal state and sending out a prompt message if the maintenance equipment is not in the initial state.

In a third aspect, the present application provides a maintenance equipment management system comprising a data management server and a block chain node device, the data management server is configured to: receive a transaction request of using a maintenance equipment from a first user, and call a usage smart contract to grant a permission of usage of the maintenance equipment to the first user according to the transaction request; wherein the usage smart contract comprises a usage agreement, a charging rule and a transaction sharing rule of the maintenance equipment; call the usage smart contract to send a transaction payment request to the first user according to transaction information when the first user finishes using the maintenance equipment; and perform a sharing according to the transaction sharing rule when the payment transaction is finished by the first user; the block chain node device is configured to receive the transaction information submitted by the data management server and register the transaction information in a block chain.

In a fourth aspect, the present application provides a data management server comprising a memory, a processor and computer program stored in the memory and executable by the processor, when executing the computer program, the processor is configured to: receive a transaction request of using a maintenance equipment from a first user and call a usage smart contract to grant a permission of usage of the maintenance equipment to the first user according to the transaction request; wherein the usage smart contract comprises a usage agreement, a charging rule and a transaction sharing rule of the maintenance equipment; call the usage smart contract to send a transaction payment request to the first user according to transaction information when the first user finishes using the maintenance equipment; perform a sharing according to the transaction sharing rule when the payment transaction is finished by the first user; and send the transaction information to the block chain node device, so that the block chain node device registers the transaction information in a block chain.

Based on fourth aspect, in a first possible implementation mode, when executing the computer program, the processor is further configured to:

receive a usage agreement of the maintenance equipment submitted by a second user and send the usage agreement of the maintenance equipment to the block chain node device before the transaction request of using the maintenance equipment is received from the first user, so that the block chain node device generates a usage smart contract according to the usage agreement and registers the usage smart contract in the block chain.

Based on the first possible implementation mode of the fourth aspect, in a second possible implementation mode, when executing the computer program, the processor is further configured to: receive investment cost information submitted by the second user before the usage agreement of the maintenance equipment submitted by the second user is received; obtain maintenance equipment information that matches with the investment cost information from the block chain node device according to the investment cost information; generate a maintenance equipment investment scheme according to the investment cost information and the maintenance equipment information that matches with the investment cost information; and send the investment scheme of the maintenance equipment to the second user.

Based on the second possible implementation mode of the fourth aspect, in a third possible implementation mode, when executing the computer program, the processor is further configured to: receive maintenance equipment information and investment cost information of the maintenance equipment submitted by the second user before the transaction request of using the maintenance equipment is received from the first user, store the maintenance equipment information and the investment cost information in association, generate digital asset information and send the digital asset information to the block chain node device, so that the block chain node device registers the digital asset information in the block chain.

Based on the fourth aspect, or based on the first implementation mode, the second implementation mode or the third implementation mode of the fourth aspect, in a fourth possible implementation mode, when executing the computer program, the processor is further configured to: calculate return on investment according to the transaction information and the investment cost information after the transaction information is sent to the block chain node device, and send return on investment to the block chain node device.

Based on the fourth possible implementation mode of the fourth aspect, in a fifth possible implementation mode, when executing the computer program, the processor is further configured to: receive a financing agreement submitted by the second user, and send the financing agreement to the block chain node device, so that the block chain node device generates a financing smart contract according to the financing agreement; wherein the financing smart contract comprises a financing rule and a financing income sharing rule; receive financing amount information submitted by a third user; and call the financing smart contract to calculate return on investment of the third user according to the financing amount information and send return on investment to the third user.

Based on the fourth aspect, or based on the first implementation mode, the second implementation mode or the third implementation mode of the fourth aspect, in a sixth possible implementation mode, when executing the computer program, the processor is further configured to: detect whether the maintenance equipment is in an initial state after the first user finishes the payment transaction; wherein the initial state is the state of the maintenance equipment before the first user uses the maintenance equipment; and determine that the maintenance equipment is in an abnormal state and send out a prompt message if the maintenance equipment is not in the initial state.

Advantageous Effects

The embodiments of the present application provide a maintenance equipment management method, the transaction request of using the maintenance equipment from the first user is received through the data management server, and the usage smart contract is called to grant the permission of usage of the maintenance equipment to the first user according to the transaction request; the permission of usage can be granted to the first user so as to implement sharing of the maintenance equipment, thereby improving a service efficiency of the maintenance equipment. When the first user finishes using the maintenance equipment, the data management server calls the usage smart contract to send the transaction payment request to the first user according to the transaction information, the transaction process is the transaction performed by calling the usage smart contract, the usage smart contract is authenticated by the block chain, the service of the maintenance equipment is transparent, such that a transparency of management of the maintenance equipment is increased, the trust degree of the transaction between the customer and the maintenance equipment is improved, and the requirements of consumers are met. When the first user finishes the payment transaction, the data management server performs the sharing according to the transaction sharing rule in the usage smart contract, such that the sharing process of the maintenance equipment is transparent, the transparency of management of the maintenance equipment can be increased, investors can be encouraged to make investment, and consumption requirements of the consumers can be met better.

BRIEF DESCRIPTION OF THE DRAWINGS

In order to describe the technical solution of the present application more clearly, the accompanying figures that need to be used in the descriptions of the embodiments or the related art are introduced briefly below.

PREFERRED EMBODIMENTS OF THE PRESENT APPLICATION

In the following descriptions, in order to illustrate but no to limit the present application, specific details such as a specific system structure, techniques or the like are proposed, thereby facilitating a thorough understanding of embodiments of the present application. In other cases, detailed descriptions of well-known systems and devices, circuits and methods are described are omitted, thereby preventing unnecessary details from obstructing the description of the present application.

In order to illustrate the technical solution in the present application, the present application is described with reference to particular embodiments below:

Embodiment I

Figure 1:
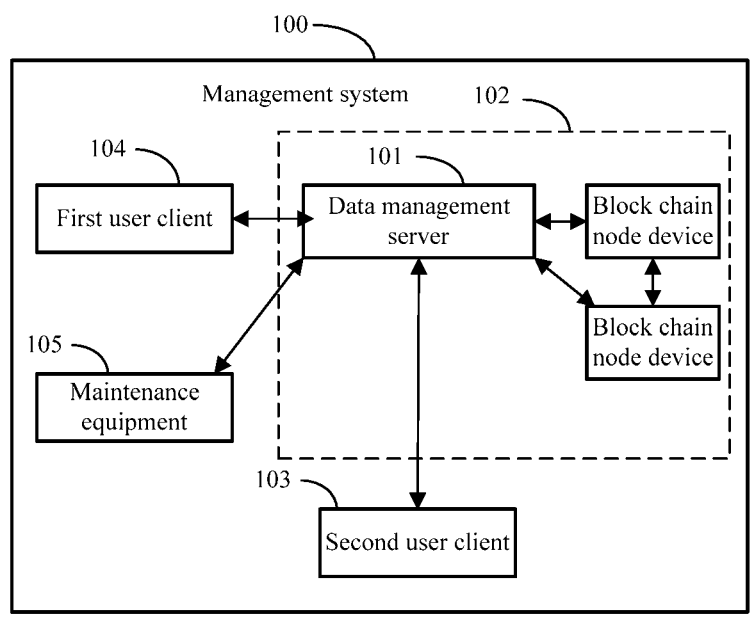
FIG. 1 illustrates a schematic view of system architecture of a maintenance equipment management system provided by embodiment I of the present application.

Embodiment I of the present application provides a maintenance equipment management method which is applied to a maintenance equipment management system. FIG. 1 illustrates a schematic view of a system architecture of the maintenance equipment management system 100, said management system 100 at least comprises a data management server 101, a block chain 102 containing a plurality of block chain node devices serving as block chain nodes, a second user client 103, a first user client 104 and a maintenance equipment 105; the aforesaid data management server 101 can have a communication connection with each of the block chain node devices in the block chain 102, the aforesaid data management server 101 can have a communication connection with the second user client 103, the aforesaid data management server 101 has a communication connection with the first user client 104 and the maintenance equipment 105 respectively. The aforesaid first user client 104 can be connected in communication connection with the maintenance equipment 105. The communication connection can be a wireless communication connection or be a wired communication, it is not limited herein.

In one embodiment, the data management server 101 may be a server that possesses a data management service platform, the data management service platform can be a software system running on a data management server, the aforesaid data management server includes but is not limited to a desktop computer, a tablet computer, a cloud server, a mobile phone terminal, and the like. The server can serve as a single server that access to the block chain by communicating with the block chain node device, and can also be a node device registered in the block chain.

In order to facilitate a better understanding of the embodiments of the present application, taking a particular application scenario as an example in the following, the aforesaid data management server 101 can be the data management server of vehicle maintenance equipment, the aforesaid second user client 103 can be a terminal device of an investor, the aforesaid first user client 104 can be a client that performs transaction with a maintenance equipment such as a terminal device of a vehicle maintenance technician, the maintenance equipment 105 can be a vehicle maintenance equipment. In the present application, an investor of a maintenance equipment has the property ownership of the maintenance equipment, a matched site, an operation and maintenance team responsible for detecting the maintenance equipment and an operator of the data management service platform are also needed to keep the maintenance service of the maintenance equipment available continuously. Therefore, the investors need to achieve a cooperation intention with the operation and maintenance team and the operator of the data management service platform in advance, and establish a maintenance station capable of providing maintenance service based on the maintenance equipment. Meanwhile, the investors form a usage agreement of the maintenance equipment based on the cooperation intention. The investors can send the usage agreement of the maintenance equipment to any block chain node device through the second user client, and the block chain node which receives the usage agreement generates a usage smart contract according to the usage agreement and registers the usage smart contract in the block chain to be broadcasted in a whole network. When the vehicle maintenance technician is entrusted by the customer to use the maintenance equipment in the maintenance equipment to repair the vehicle, he/she can make a reservation with a maintenance equipment through the first user client firstly, after the reservation is successful, the vehicle maintenance technician enters the vehicle maintenance equipment in a reserved time, and sends a transaction request of using the maintenance equipment to the data management server, the data management server detects a permission of usage in the first user account according to the transaction request such as detecting whether a registration has been submitted, and whether a deposit is paid. If the permission of usage is met, the usage smart contract is called to grant the permission of usage of the maintenance equipment to the first user client. When the vehicle maintenance technician finishes using the maintenance equipment, an end use instruction is sent by the first user client, the data management server calls the usage smart contract to send a transaction payment request to the first user client according to the transaction information; when the vehicle maintenance technician completes payment transaction through the first user client, the data management server performing sharing according to the transaction sharing rule; the block chain node device receives the transaction information submitted by the data management server and registers the transaction information in the block chain.

Figure 2:
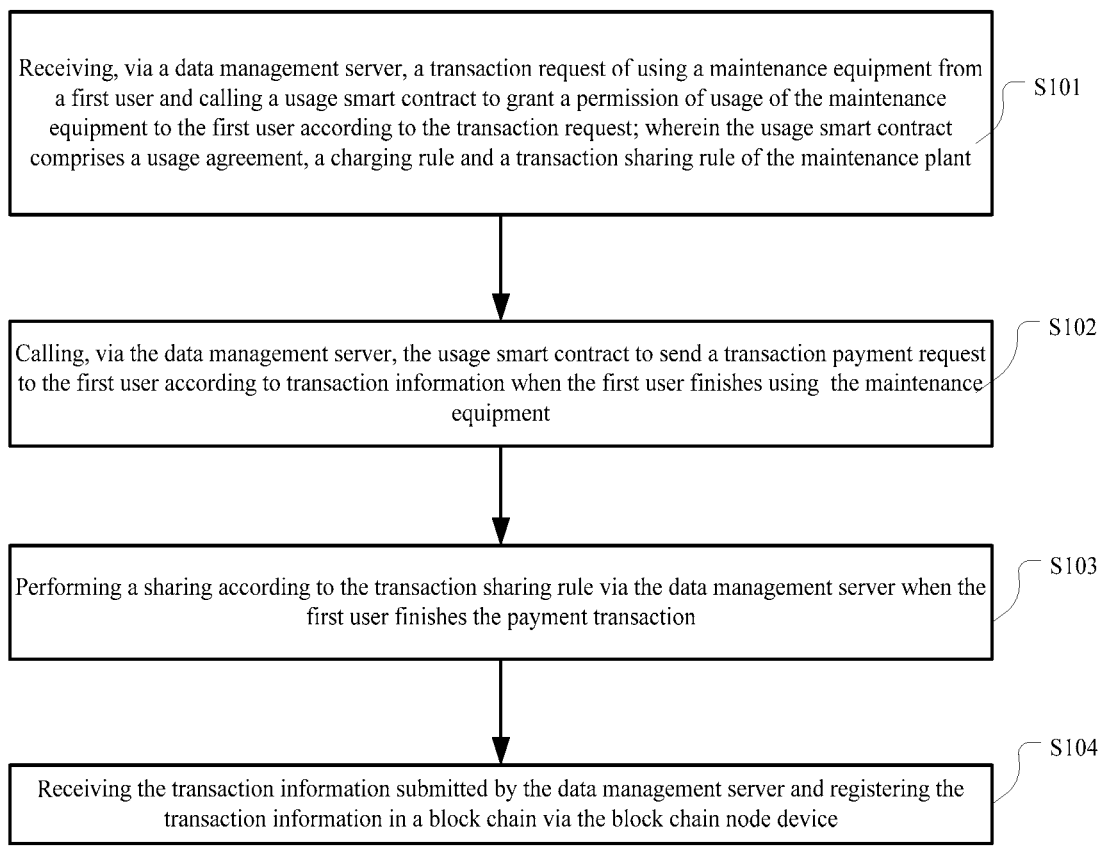
FIG. 2 illustrates a schematic flow diagram of a maintenance equipment management method provided by embodiment I of the present application.

As shown in FIG. 2, this embodiment provides a maintenance equipment management method which comprises:

step 101, receiving a transaction request of using the maintenance equipment from a first user and calling a usage smart contract to grant a permission of usage of the maintenance equipment to the first user according to the transaction request via a data management server; wherein the usage smart contract comprises a usage agreement, a charging rule and a transaction sharing rule of the maintenance equipment.

In the embodiment of the present application, the first user can be a user that transacts with the maintenance equipment, when the first user requests to make a transaction, the usage smart contract is called, and whether the user who requests to make the transaction meets the usage agreement specified in the smart contract is judged. If the usage agreement is met, the permission of usage of the maintenance equipment is granted to the first user. The permission of usage of the maintenance equipment can be indicating the maintenance equipment to be in a state that the first user can use it to do maintenance thing, or sending the password for unlocking the maintenance equipment to the first user client.

In one embodiment, the usage smart contracts is the one based on the block chain technology, can be driven by an event, and includes a computer program capable of running a reproducible shared block chain data book. That is, the usage smart contract is an embedded programming contract, and can generate transactions by performing corresponding actions of executing the usage smart contract (e.g., the maintenance equipment starts to be used by the user) under the condition that the usage smart contract (e.g., the condition that the usage smart contract is triggered to be executed can be receiving a code scanning operation of the user) is triggered to be executed according to a plurality of pre-defined rules (e.g., the maintenance equipment is started for the user to use).

In a specific application scene, said transaction requested by the first user can be a scanning instruction of the client or other triggering instruction that performs the transaction request. When the maintenance equipment is a vehicle maintenance equipment, the first user can be a vehicle maintenance technician, the vehicle maintenance technician requests the transaction from the data management server through the client; the data management server judges whether the usage agreement is met, and execute the next step according to the usage agreement of the usage smart contract. Of course, the first user may also be other person, such as a vehicle owner, and the like, it is not limited herein.

Step 102, calling the usage smart contract to send a transaction payment request to the first user according to the transaction information via the data management server when the first user finishes using the maintenance equipment.

In the embodiment of the present application, when the first user finishes using the maintenance equipment, the data management server calculates the charging amount according to the charging rule in the usage smart contract and the usage information of the first user such as service time and equipment type, and the like, and sends a payment request containing the charging amount to the first user to be confirmed. After receiving the payment request, the first user conducts a corresponding operation such as confirming the payment, thereby completing the transaction.

Step 103, performing a sharing according to the transaction sharing rule via the data management server when the first user finishes the payment transaction.

In one embodiment, when a payment transaction is completed by a first user, the data management server performs the sharing according to the transaction sharing rule in the smart contract. For example, the transaction is the proportion of income generated by the pre-determined transaction, since the investor of the maintenance equipment has the property ownership of the maintenance equipment, the matched site, the operation and maintenance team responsible for detecting the maintenance equipment, and the operator of the data management service platform are also needed, assuming that the preset income proportion is that: the investor of the maintenance equipment has the income proportion of 40%, the owner of the maintenance station has the income proportion of 40%, the operation and maintenance team of the maintenance equipment has the income proportion of 10%, and the operator of the data management service platform has the income proportion of 10%. In the actual application, the income proportion can be determined by participators including the investor of the maintenance equipment, the operation and maintenance team, the operator of the data management service platform through a joint negotiation.

In one embodiment, performing the sharing according to the transaction sharing rule can be sharing the income generated in a real-time transaction, and call the usage smart contract from the block chain to calculate income share information and share the income generated in a real-time transaction. Or as an alternative, performing the sharing according to the transaction sharing rule can be calling the usage smart contract from the block chain to calculate the income share information and performing the sharing based on the income of the transaction information stored in the block chain node device within a preset time such as within a certain period.

Step 104, receiving the transaction information submitted by the data management server and registers the transaction information in the block chain via the block chain node device.

In the embodiment of the present application, the block chain is a distributed network system, and has the characteristic that enables each node to efficiently achieve a consensus on the effectiveness of the block data in a decentralization system having a highly distributed decision weight, that is, a common mechanism characteristic of the block chain. Therefore, when the block chain node device receives the transaction information submitted by the data management server, the transaction information can be registered and broadcasted to other block chain node device, can be stored, and has a tamper-resistant characteristic.

In view of this, in the embodiment of the application, the transaction request of using the maintenance equipment from the first user is received through the data management server, and the usage smart contract is called to grant the permission of usage of the maintenance equipment to the first user according to the transaction request; the permission of usage can be granted to the first user so as to implement sharing of the maintenance equipment, thereby improving a service efficiency of the maintenance equipment. When the first user finishes using the maintenance equipment, the data management server calls the usage smart contract to send the transaction payment request to the first user according to the transaction information, the transaction process is the transaction performed by calling the usage smart contract, the usage smart contract is authenticated by the block chain, the service of the maintenance equipment is transparent, such that a transparency of management of the maintenance equipment is increased, the trust degree of the transaction between the customer and the maintenance equipment is improved, and the requirements of consumers are met. When the first user finishes the payment transaction, the data management server performs the sharing according to the transaction sharing rule in the usage smart contract, such that the sharing process of the maintenance equipment is transparent, the transparency of management of the maintenance equipment can be increased, investors can be encouraged to make investment, and consumption requirements of the consumers can be met better.

Embodiment II

Figure 3:
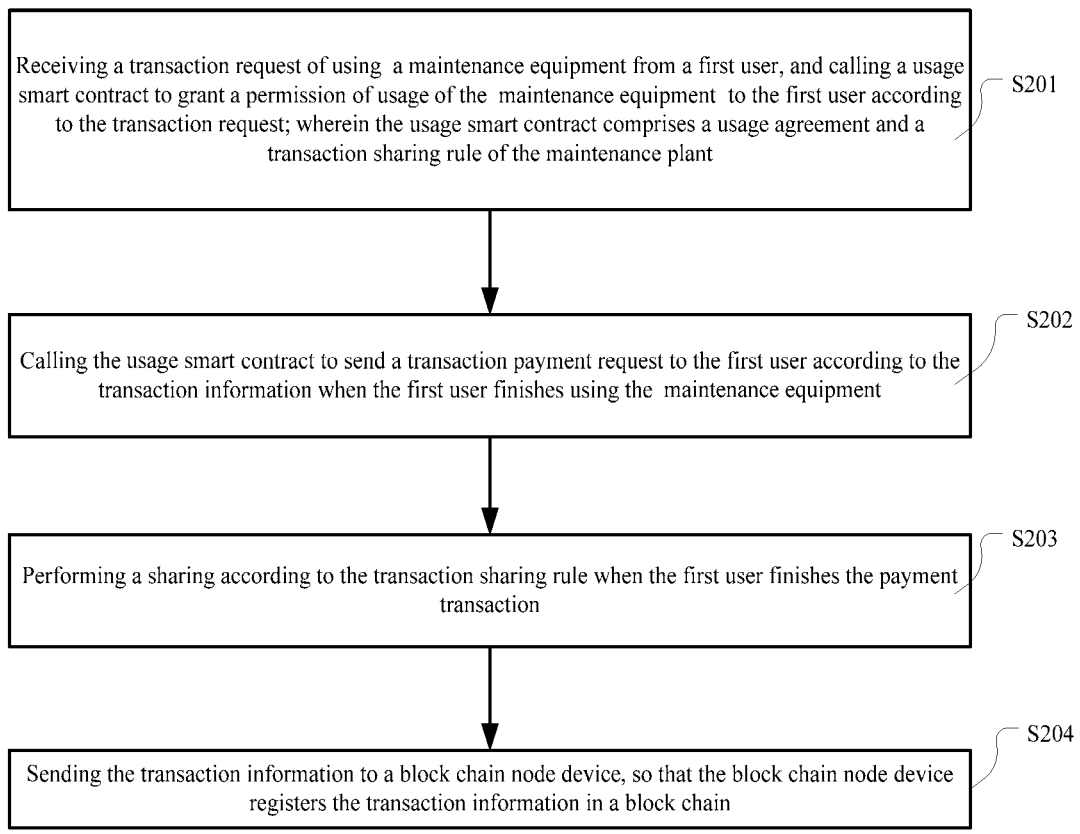
FIG. 3 illustrates a schematic flow diagram of a maintenance equipment management method provided by embodiment II of the present application.

A maintenance equipment management method provided by a second embodiment of the present application is described below, the management method described in this embodiment is applied to a data management server, as shown in FIG. 3, regarding the part of the embodiment that is the same or similar to the aforesaid embodiment I, reference can be made to the relevant descriptions in embodiment I, it is not repeatedly described herein. The management method in this embodiment comprises:

Step 201, receiving a transaction request of using a maintenance equipment from a first user, and calling a usage smart contract to grant a permission of usage of the maintenance equipment to the first user; wherein the usage smart contract comprises a usage agreement, a charging rule and a transaction sharing rule of the maintenance equipment.

Step 202, calling the usage smart contract according to the transaction information to send a transaction payment request to the first user when the first user finishes using the maintenance equipment.

Step 203, performing the sharing according to the transaction sharing rule when the first user finishes payment transaction.

Step 204, sending the transaction information to a block chain node device, such that the block chain node device registers the transaction information in a block chain.

In the embodiment of the present application, regarding the parts of steps 201-204 which are the same or similar to that of steps 101-104 respectively, reference can be made to the relevant descriptions in steps 101-104, it is not repeated described herein.

In one embodiment, the management method further comprises: detecting whether the maintenance equipment is in an initial state when the first user finishes the payment transaction; wherein the initial state is the state of the maintenance equipment before the first user uses the maintenance equipment. The state of the maintenance equipment before the user uses the maintenance equipment can be interpreted as the position where the maintenance equipment is located before the user uses the maintenance equipment. When the user finishes the transaction, whether the maintenance equipment lies in the position where the maintenance equipment is located before the user uses the maintenance equipment is detected, or as an alternative, whether the maintenance equipment lies within a preset position range before the maintenance equipment is used. In other words, whether the maintenance equipment is reseated after the user uses the maintenance equipment is detected.

In one embodiment, the maintenance equipment is determined to be in an abnormal state and a prompt message is sent out when the maintenance device is not in the initial state. It can be understood that, the maintenance equipment is determined to be in an abnormal state and the prompt information is sent to the user when detecting that the maintenance equipment is not located at the position before it is used, or detecting that the maintenance equipment is not located within the preset location range before it is used.

In view of this, in the embodiment of the application, the transaction request of using the maintenance equipment from the first user is received through the data management server, and the usage smart contract is called to grant the permission of usage of the maintenance equipment to the first user according to the transaction request; the permission of usage can be granted to the first user so as to implement sharing of the maintenance equipment, thereby improving a service efficiency of the maintenance equipment. When the first user finishes using the maintenance equipment, the data management server calls the usage smart contract to send the transaction payment request to the first user according to the transaction information, the transaction process is the transaction performed by calling the usage smart contract, the usage smart contract is authenticated by the block chain, the service of the maintenance equipment is transparent, such that a transparency of management of the maintenance equipment is increased, the trust degree of the transaction between the customer and the maintenance equipment is improved, and the requirements of consumers are met. When the first user finishes the payment transaction, the data management server performs the sharing according to the transaction sharing rule in the usage smart contract, such that the sharing process of the maintenance equipment is transparent, the transparency of management of the maintenance equipment can be increased, investors can be encouraged to make investment, and consumption requirements of the consumers can be met better.

Embodiment III

Figure 4:
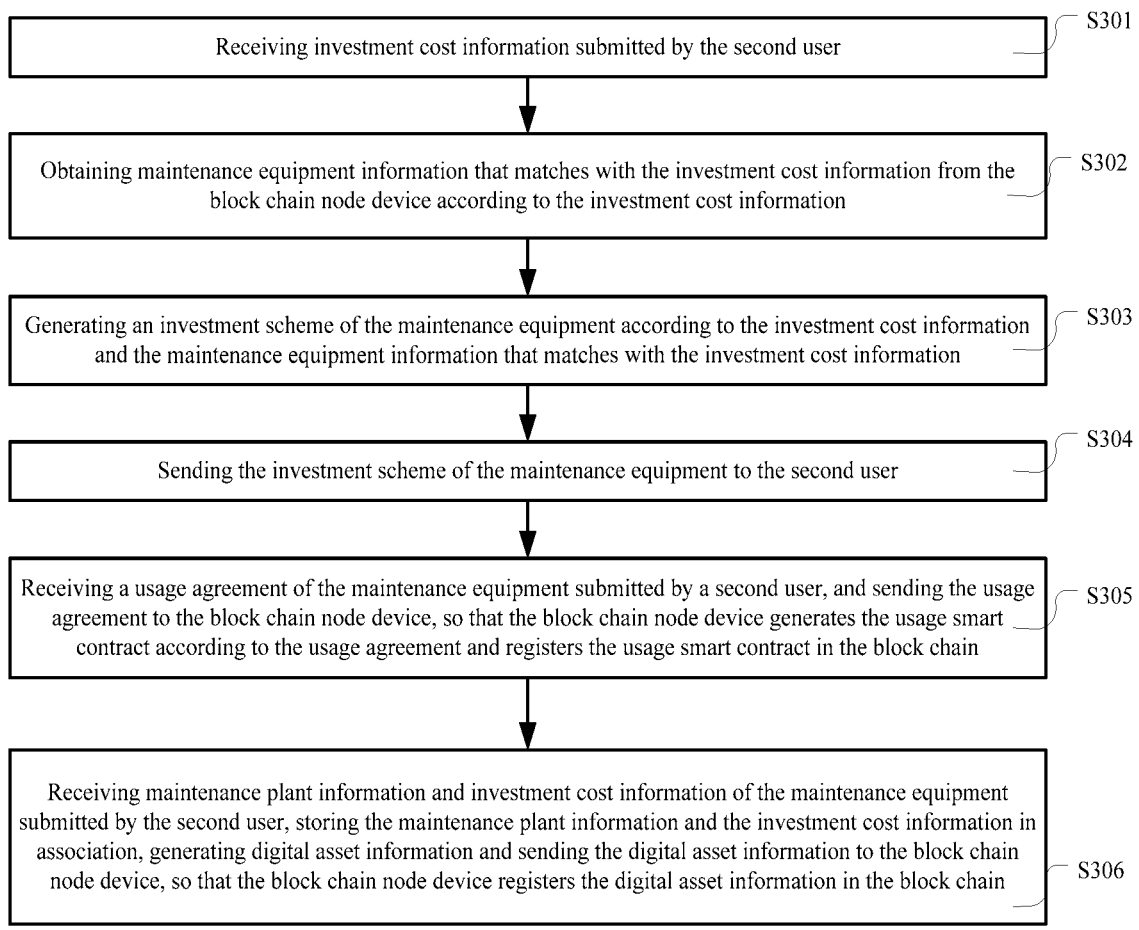
FIG. 4 illustrates a schematic flow diagram of a maintenance equipment management method provided by embodiment III of the present application.

A maintenance equipment management method provided by embodiment III of the present application is described below, the embodiment III is implemented on the basis of embodiment II, regarding the part of embodiment III that is the same as or similar to embodiment II, reference can be made to the relevant descriptions in embodiment II, and it is not repeatedly described herein. As shown in FIG. 4, in this embodiment, before step 201, the method further comprises:

Step 301, receiving investment cost information submitted by a second user.

In the embodiment of the present application, the second user can be an investor, for example, the investor can log in his account through a second user client and submit the investment cost information. The aforesaid investment cost information can include an investment amount, an investment type, and the like.

Step 302, obtaining maintenance equipment information that matches with the investment cost information from the block chain node device according to the investment cost information.

In this embodiment of the present application, when the second user needs to obtain the maintenance equipment information for establishing the maintenance equipment, he/she can obtain maintenance equipment information which has been stored and authenticated from the block chain node device. Since the block chain is decentralized, and can implement a point-to-point transaction, coordination and cooperation based on a decentralization credit in a distributed system in which nodes need not to be mutually trusted by applying approaches such as data encryption, time stamps, distributed consensus, economic excitation and so on, problems including a high cost, a low efficiency, and unsafe data storage which widely exist in the centralization mechanism can be solved. Thus, the maintenance equipment information and the site information which are obtained from block chain node device are high in reliability and are convenient to be obtained.

In one embodiment, obtaining the maintenance equipment information that matches with the investment cost information from the block chain node device can be implemented by using the data management server to match up and obtain the maintenance equipment information that matches with the investment cost information in a database of the block chain according to the investment cost information input by the second user. For example, in one application scenario, when the price input by the investor is 2 million RMB and the investment type is a maintenance equipment, the maintenance equipment information (e.g., the maintenance equipment information can be a lifting machine, a tire disassembling machine, a balance machine, a four-wheel orientation device, a maintenance equipment such as a cleaning device, the number of the maintenance equipment and the acquisition price of the equipment and the like, the acquisition price can be the purchase price or the rental price) that matches with 2 million RMB can be obtained from the block chain.

Step 303, generating an investment scheme of the maintenance equipment according to the maintenance cost information matched with the investment cost information equipment information and site information.

In the embodiment of the present application, the investment scheme of the maintenance equipment is generated according to the maintenance equipment information that matches with the investment cost information, the investment scheme can be generated automatically according to a pre-defined investment scheme mode, for example, an investment scheme can be generated by combining the equipment information and the site information matched with the investment information with other relevant information such as the operation and maintenance team and the operator of the data management service platform, and is provided to the second user for reference. The second user can use the maintenance equipment information and the venue information in the investment scheme, and establishes shared maintenance equipment with networking by combining an operation and maintenance team and an operator of the data management service platform. The second user can establish shared maintenance equipment with networking according to the maintenance equipment information and the site information in the investment scheme and by combining the operation and maintenance team and the operator of the data management service platform. Of course, the second user can make an adjustment investment and establish the maintenance equipment on the basis of the investment scheme.

Step 304, sending the investment scheme of the maintenance equipment to the second user.

In this embodiment of the present application, the investment scheme of the maintenance equipment is sent to the second user client, or sent to the mobile terminal pre-registered by the second user in the form of information, thereby providing reference for the second user.

Step 305, receiving a usage agreement of the maintenance equipment submitted by the second user, sending the usage agreement to the block chain node device, so that the block chain node device generates the usage smart contract according to the usage agreement and registers the usage smart contract in the block chain.

In this embodiment of the present application, the aforesaid usage agreement can be a template agreement provided by the data management server, and is submitted after being confirmed by the second user and the operation and maintenance team of the maintenance equipment, and can also be uploaded after the second user makes an agreement with the operation and maintenance team and the operator of the data management service platform. The usage agreement includes but is not limited to the usage agreement of the maintenance equipment (e.g., how long the maintenance equipment has been used and how much money should the user pay, support of the mode of payment), income sharing rule of the maintenance equipment (e.g., sharing the income generated by transaction according to a certain proportion, the share proportion of income of the investor of the maintenance equipment, the share proportion of income of the owner of the maintenance station, the share proportion of the operation and maintenance team, the share proportion of the operator of the data management service platform, and the like). The usage agreement is sent to node device of the block chain network, and the usage smart contract can be generated according to the usage agreement through block chain technology; and the usage smart contract is sent to the block chain node device to be stored, authenticated and broadcasted in a whole network, the usage smart contract is a contract preset and executable by a computing device by applying technical means such as data encryption and time stamps, and so on.

In one embodiment, the usage smart contract can be established through the reserved programmable interface according to the usage agreement, and the usage smart contract based on the block chain is an smart contract that is embedded with a relevant rule (the usage agreement of the maintenance equipment, the charging rule and the transaction sharing rule) of the shared maintenance equipment, and the smart contract is deployed on the block chain, and can share the income generated by making transaction with the maintenance equipment according to the usage smart contract; moreover, since the block chain technology has the characteristics of decentralized storage and authentication, which differs from the condition that the execution of the contract is guaranteed by a central entity in traditional transaction, so that justice and equity of the contract can be guaranteed to a great extent.

Step 306, receiving the maintenance equipment information and the investment cost information of the maintenance equipment submitted by the second user, storing the maintenance equipment information and the investment cost information in association, generating digital asset information and sending the digital asset information to the block chain node device, such that the block chain node device registers the digital asset information in a block chain.

In this embodiment of the present application, the second user can be the investor or other user, the maintenance equipment information can include but is not limited to the information including the maintenance equipment type, maintenance equipment purchase price, etc. Wherein, the maintenance equipment purchase price can include a rental price or purchase price of the maintenance equipment. The investment cost information can include the investment amount, the investment type and the like. The maintenance equipment information and the investment cost information of the maintenance equipment submitted by the second user are received. The data management server can generate the digital asset information with reference to the investment cost information and the maintenance equipment information. The digital asset information is presented in the form of electronic data, and can reflect the property ownership and the right of use of tangible asset. Sending the digital asset information to the block chain node device can be implemented by generating a unique identification along with the digital assets through the block chain technology, and then deploying the unique identification on the block chain node device. In this way, the digital assets based on the block chains can be authenticated, and because that the block chain has the characteristics of tracing and tamper resistance, the reliability can be improved by uploading the digital asset information to the block chain.

In one embodiment, the method further comprises steps 201-204 shown in the embodiment shown in FIG. 3 after step 306, regarding the details, reference can be made to relevant descriptions in steps 201-204, it is not repeatedly described herein.

In view of this, in this embodiment of the present application, sending the digital asset information to the block chain node device can be implemented by generating a unique identification along with the digital assets through the block chain technology, and then deploying the unique identification on the block chain node device. In this way, the digital assets based on the block chains can be authenticated, and because that the block chain has the characteristics of tracing and tamper resistance, the reliability can be improved by uploading the digital asset information to the block chain. In addition, the maintenance equipment information which matches with the investment cost information can be obtained from the block chain node device according to the investment cost information, and the investment scheme of the maintenance equipment is generated according to the investment cost information and the maintenance equipment information that matches with the investment cost information. Since the block chain can solve the problem of high cost, low efficiency, and unsafe data storage widely exist in the decentralized mechanism, thus, the investment scheme generated by the equipment information which is obtained from node device of the block chain network has high reliability, which can encourage the investors to make investments, thereby meeting the consumer demands of the consumers better.

Embodiment IV

Figure 5:
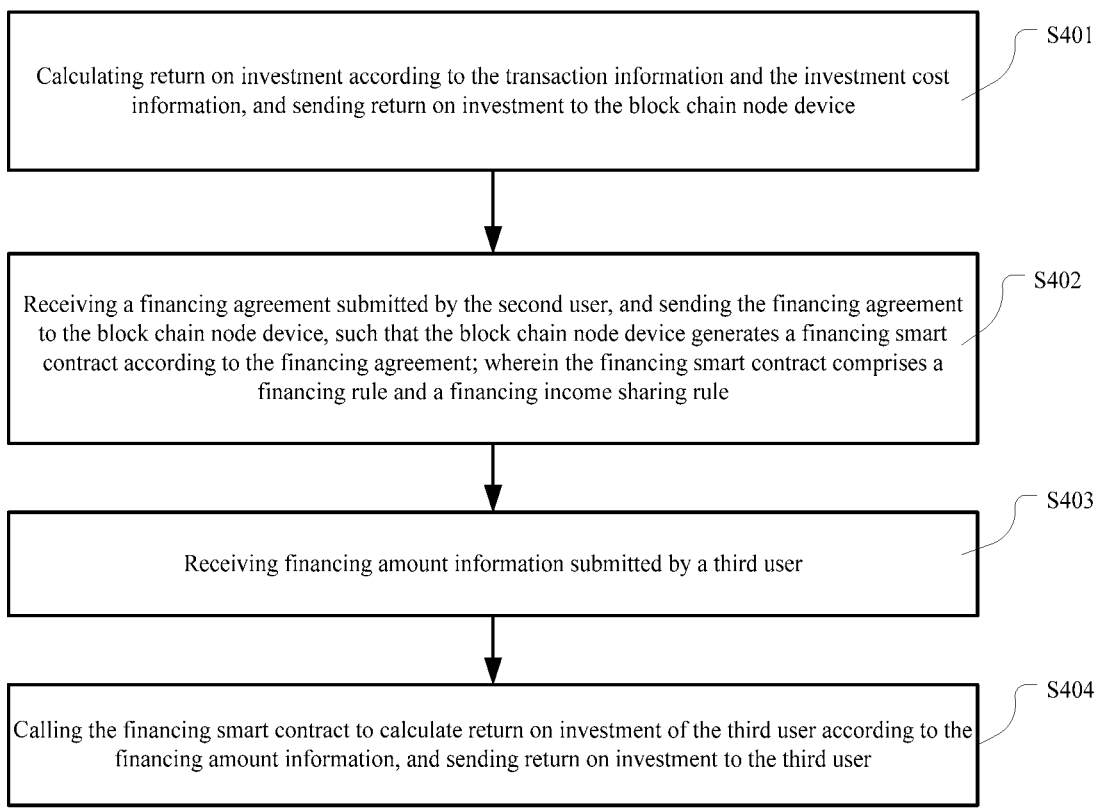
FIG. 5 illustrates a schematic flow diagram of a maintenance equipment management method provided by embodiment IV of the present application.

A maintenance equipment management method provided by embodiment IV of the present application is described below, embodiment IV of the present application is implemented based on embodiment II or embodiment III, regarding the part that is the same or similar to embodiment II or embodiment III, reference can be made to the relevant descriptions in embodiment II or embodiment III, it is not repeatedly described herein. As shown in FIG. 5, in this embodiment, after step S204, the maintenance equipment management method further comprises:

step 401, calculating return on investment according to the transaction information and the investment cost information, and sending return on investment to the block chain node device.

In the embodiment of the present application, the investment cost information can be calculated according to real-time transaction information and the investment cost information acquired from the block chain node device. Alternatively, return on investment can also be calculated according to the transaction information and the investment cost information acquired from the block chain node device within a certain period.

Step 402, receiving a financing agreement submitted by a second user, sending the financing agreement to the block chain node device, such that the block chain node device can generate a financing smart contract according to the financing agreement; wherein the financing smart contract comprises a financing rule and a financing income sharing rule.

In the embodiment of the present application, when the second user needs to broad the business of the maintenance equipment, more funds need to be invested, the financing agreement can be established by the second user. Of course, the aforesaid financing agreement can be an agreement established by the second user and other users related to the maintenance equipment (e.g., an operation and maintenance team, the owner of the maintenance site). The financing agreement includes the financing rule and the financing income sharing rule. The financing agreement is sent to the block chain node device, when the financing agreement is received, the block chain node device can generate the financing smart contract through block chain technology, according to the financing rule, and using technical means such as data encryption, time stamps, etc., and associate the financing smart contract of the maintenance equipment with the corresponding return on investment which is updated in real-time, such that the financier can obtain the financing smart contract based on any node of the block chain network, and then take return on investment of the previous maintenance equipment as reference.

Step 403, receiving financing amount information submitted by a third user.

In the embodiment of the present application, the third user can be a financier, and the third user can obtain the financing smart contract and return on investment corresponding to the maintenance equipment from the block chain node device. When the third user submits the financing amount information, the financing amount information submitted by the third user is received by the data management server.

Step 404, calling the financing smart contract according to the financing amount information, calculating return on investment of the third user and sending return on investment to the third user.

In the embodiment of the present application, when receiving the financing amount information submitted by the third user, the data management server can calculate return on investment corresponding to the financing amount information according to the ratio of the investment cost information of the maintenance equipment to return on investment, and the financing smart contract called from the block chain node device, and send return on investment to the third user client, or send return on investment in the form of information to a mobile terminal pre-registered by the third user, thereby providing reference for the third user.

In view of this, in the embodiment of the application, the transaction request of using the maintenance equipment from the first user is received through the data management server, and the usage smart contract is called to grant the permission of usage of the maintenance equipment to the first user according to the transaction request; the permission of usage can be granted to the first user so as to implement sharing of the maintenance equipment, thereby improving a service efficiency of the maintenance equipment. When the first user finishes using the maintenance equipment, the data management server calls the usage smart contract to send the transaction payment request to the first user according to the transaction information, the transaction process is the transaction performed by calling the usage smart contract, the usage smart contract is authenticated by the block chain, the service of the maintenance equipment is transparent, such that a transparency of management of the maintenance equipment is increased, the trust degree of the transaction between the customer and the maintenance equipment is improved, and the requirements of consumers are met. When the first user finishes the payment transaction, the data management server performs the sharing according to the transaction sharing rule in the usage smart contract, such that the sharing process of the maintenance equipment is transparent, the transparency of management of the maintenance equipment can be increased, investors can be encouraged to make investment, and consumption requirements of the consumers can be met better.

Embodiment V

Figure 6:
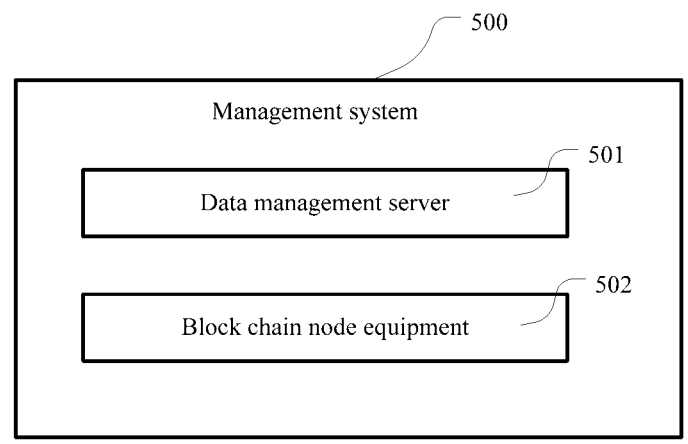
FIG. 6 illustrates a structural schematic view of a maintenance equipment management system provided by embodiment V of the present application.

Embodiment V of the present application provides a structural schematic view of a maintenance equipment management system, as shown in FIG. 6, the management system 500 comprises a data management server 501 and a block chain node device 502;

the data management server 501 is configured to receive a transaction request of using the maintenance equipment from a first user, and call a usage smart contract to grant a permission of usage of the maintenance equipment to a first user according to the transaction request; wherein the smart contract comprises a usage agreement, a charging rule and a transaction sharing rule of the maintenance equipment; when the first user finishes using the maintenance equipment, call the usage smart contract to send the transaction payment request to the first user according to the transaction information, and perform a sharing according to the transaction sharing rule when the first user finishes the payment transaction;

The block chain node device 502 is configured to receive the transaction information submitted by the data management server 501 and register the transaction information in a block chain.

In view of this, in the embodiment of the application, the transaction request of using the maintenance equipment from the first user is received through the data management server, and the usage smart contract is called to grant the permission of usage of the maintenance equipment to the first user according to the transaction request; the permission of usage can be granted to the first user so as to implement sharing of the maintenance equipment, thereby improving a service efficiency of the maintenance equipment. When the first user finishes using the maintenance equipment, the data management server calls the usage smart contract to send the transaction payment request to the first user according to the transaction information, the transaction process is the transaction performed by calling the usage smart contract, the usage smart contract is authenticated by the block chain, the service of the maintenance equipment is transparent, such that a transparency of management of the maintenance equipment is increased, the trust degree of the transaction between the customer and the maintenance equipment is improved, and the requirements of consumers are met. When the first user finishes the payment transaction, the data management server performs the sharing according to the transaction sharing rule in the usage smart contract, such that the sharing process of the maintenance equipment is transparent, the transparency of management of the maintenance equipment can be increased, investors can be encouraged to make investment, and consumption requirements of the consumers can be met better.

Embodiment VI

Figure 7:
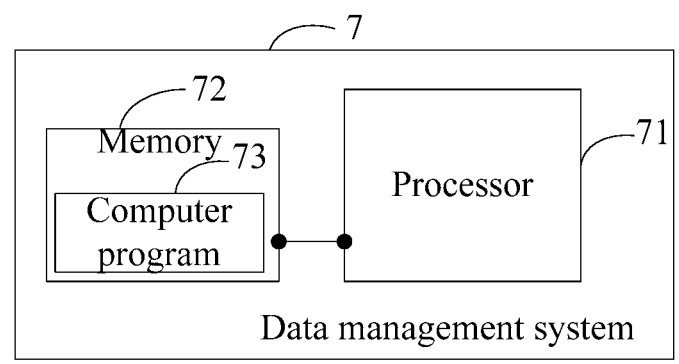
FIG. 7 illustrates a schematic view of a data management server provided by embodiment VI of the present application.

Embodiment VI of the present application provides a schematic view of a data management server, as shown in FIG. 7, the data management server 7 in this embodiment comprises: a processor 71, a memory 72 and computer program 73 stored in the memory 72 and executable by the processor 71. When the computer program 73 is executed by the processor 71, the processor 71 is configured to:

receive a transaction request of using the maintenance equipment from a first user, and call a usage smart contract to grant a permission of usage of the maintenance equipment to the first user according to the transaction request; wherein the smart contract comprises a usage agreement, a charging rule and a transaction sharing rule of the maintenance equipment; call the usage smart contract to send a transaction payment request to the first user according to the transaction information when the first user finishes using the maintenance equipment; performs a sharing according to the transaction sharing rule when the first user finishes payment transaction; and send the transaction information to the block chain node device, such that the block chain node device can register the transaction information in a block chain.

In one embodiment, when executing the computer program 73, the processor 71 is further configured to: receive, before receiving the transaction request of using the maintenance equipment from the first user, a maintenance equipment usage agreement submitted by a second user, send the usage agreement to the block chain node device, such that the block chain node device can generate the usage smart contract according to the usage agreement and registers the usage smart contract in the block chain.

In one embodiment, when executing the computer program 73, the processor 71 is further configured to: receive, before receiving the maintenance equipment usage agreement submitted by the second user, investment cost information submitted by the second user; acquire maintenance equipment information and site information matched with the investment cost information from the block chain node device according to the investment cost information; generate a maintenance equipment investment scheme according to the maintenance equipment information that matches with the investment cost information; and send the maintenance equipment investment scheme to the second user.

In one embodiment, when executing the computer program 73, the processor 71 is further configured to: receive, before receiving the transaction request of using the maintenance equipment from the first user, the maintenance equipment information and the investment cost information of the maintenance equipment submitted by the second user, and store the maintenance equipment information and the investment cost information in association, generate digital asset information and send the digital asset information to the block chain node device, such that the block chain node device can register the digital asset information in a block chain.

In one embodiment, when executing the computer program 73, the processor 71 is further configured to: calculate return on investment according to the transaction information and the investment cost information, and send return on investment to the block chain node device after the transaction information is sent to the block chain node device.

In one embodiment, when executing the computer program 73, the processor 71 is further configured to: receive a financing agreement submitted by the second user, send the financing agreement to the block chain node device, such that the block chain node device can generate a financing smart contract according to the financing agreement, wherein the financing smart contract includes a financing rule and a financing income sharing rule; receive financing amount information submitted by a third user; call the financing smart contract according to the financing amount information, calculate return on investment information of the third user and send return on investment to the third user.

In one embodiment, when executing the computer program 73, the processor 71 is further configured to: detect whether the maintenance equipment is in an initial state; wherein the initial state is the state of the maintenance equipment before the first user uses the maintenance equipment; and determine that the maintenance equipment is in an abnormal state and send out a prompt message if the maintenance equipment is not in the initial state.

Exemplarily, the aforesaid computer program 73 can be divided into one or a plurality of units/modules, the one or plurality of units/modules can be stored in the memory 72 and is/are executed by the processor 71, thereby implementing the present application.

The data management server 7 can be a computing device such as a cloud server, an intelligent device, a computer, a notebook, and a palm computer, etc. The aforesaid data management server 7 can include but is not limited to: the processor 71, the memory 72. It can be understood for one of ordinary skill in the art that, FIG. 7 is merely an example of the data management server 7, and is not constituted as the limitation to the data management server 7, more or less components shown in FIG. 7 can be included, or some components or different components can be combined; for example, the aforesaid data management server 7 can also include an input and output device, a network access device, a bus, etc.

The so called processor 71 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 72 can be an internal storage unit of the data management server 7, such as a hard disk or a memory of the data management server 7. The memory 72 can also be an external storage device of the data management server 7, such as a plug-in hard disk, a SMC (Smart Media Card), a SD (Secure Digital) card, a FC (Flash Card) equipped on the data management server 10. Further, the memory 72 may include both the internal storage unit and the external storage device of the data management server 7, either. The memory 72 is configured to store the computer programs, and other procedures and data needed by the data management server 7. The memory 72 can also be configured to storing data that has been output or being ready to be output temporarily.

It can be clearly understood by one of ordinary skill in the art that, for describing conveniently and concisely, regarding the detailed working process described above, reference can be made to the corresponding process in the previously described method embodiments, and it is not repeatedly described herein.

In some embodiments provided by the present application, it can be understood that, the system, data management server and method can be implemented according to some other approaches. The units described as separate components can be or not be physically separate, the components shown as units can be or not be physical units. A part or whole of the units could be selected to achieve the objective of the technical solution of this embodiment according to actual need.

If the functionalities are achieved in the form of software functional units, and are sold or used as an independent product, they can be stored in a computer readable storage medium. Based on this understanding, the technical solution of the present application, or the part that is contributable to related art, or a part of the technical solution can be embodied in the form of software product essentially, the computer softer product is stored in a storage medium and includes an instruction that enables a computer device (which can be a personal computer, a server, or a network device, and the like) to execute all or part of steps of methods in the various embodiments of the present application. The aforesaid storage medium includes: various mediums capable of storing program codes such as USB flash disk, mobile hard disk, computer storage device, ROM (Read-Only Memory), RAM (Random Access Memory), hard disk, optical disk, and the like.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A maintenance equipment management method, wherein the management method is applied in a data management server being in communication with a plurality of block chain node devices contained in a block chain, a first user client terminal, a second user client terminal, and a maintenance equipment respectively, the method comprises:
   receiving, by the data management server, a transaction request of using maintenance equipment from a first user client terminal;
   calling, by the data management server, a usage smart contract registered in one block chain node device to grant a permission of usage of the maintenance equipment to a first user according to the transaction request; wherein the usage smart contract comprises a usage agreement, a charging rule and a transaction sharing rule of the maintenance equipment;
   calling, by the data management server, the usage smart contract registered in the block chain node device to send a payment transaction request to the first user client terminal according to the transaction information, when the maintenance equipment is no longer used by the first user;
   performing, by the data management server, a sharing according to the transaction sharing rule of the maintenance equipment when the payment transaction performed on the first user client terminal is finished; and
   sending, by the data management server, the transaction information to the block chain node device, so that the block chain node device registers the transaction information in the block chain,
   wherein after the payment transaction performed on the first user client terminal is finished, the method further comprises:
   detecting, by the data management server, whether the maintenance equipment is located within a preset range of a location before the maintenance equipment is used, and sending out, by the data management server, a prompt message to the first user when the maintenance equipment is not located within the preset range of the location.

2. The maintenance equipment management method according to claim 1, wherein before receiving, by the data management server, the transaction request of using the maintenance equipment from the first user client terminal, the method further comprises:
   receiving, by the data management server, a maintenance equipment usage agreement submitted by the second user client terminal and sending the usage agreement to the block chain node device, so that the block chain node device generates the usage smart contract according to the usage agreement, store and authenticate the usage smart contract, and broadcast the usage smart contract information to other block chain node devices in the block chain.

3. The maintenance equipment management method according to claim 1, wherein before receiving, by the data management server, the transaction request of using the maintenance equipment from the first user client terminal, the method further comprises: receiving maintenance equipment information and investment cost information of the maintenance equipment submitted by the second user client terminal, storing the maintenance equipment information and the investment cost information, generating digital asset information and sending the digital asset information to the block chain node device to be registered.

4. The maintenance equipment management method according to claim 1,
   wherein after sending, by the data management server, the transaction information to the block chain node device, the method further comprises:
   by the data management server, calculating return on investment of a second user according to the transaction information and the investment cost information and sending return on investment of the second user to the block chain node device.

5. A maintenance equipment management system, comprising a data management server, a plurality of block chain node devices communicated with the data management server, and a first user client terminal communicated with the data management server, wherein:
   the plurality of block chain node devices are contained in a block chain;
   the data management server is configured to:
      receive a transaction request of using a maintenance equipment from the first user client terminal;
      call a usage smart contract from one block chain node device to grant a permission of usage of the maintenance equipment to a first user according to the transaction request; wherein the usage smart contract comprises a usage agreement, a charging rule and a transaction sharing rule of the maintenance equipment;
      call the usage smart contract from the block chain node device to send a payment transaction request to the first user according to the transaction information, when the maintenance equipment is no longer used by the first user; and
      perform a sharing according to the transaction sharing rule when the payment transaction is finished by the first user;
   the block chain node device is configured to receive the transaction information submitted by the data management server and register the transaction information in the block chain;
   wherein after the payment transaction performed on the first user client terminal is finished, the data management server is further configured to:
      detect whether the maintenance equipment is located within a preset range of a location before the maintenance equipment is used; and
      send out a prompt message to the first user when the maintenance equipment is not located within the preset range of the location.

6. A data management server being in communication with a plurality of block chain node devices contained in a block chain, a first user client terminal, a second user client terminal and a maintenance equipment respectively, comprising a memory, a processor and computer program stored in the memory and executable by the processor, wherein when executing the computer program, the processor is configured to:
   receive a transaction request of using the maintenance equipment from the first user client terminal;
   call a usage smart contract from one block chain node device in the block chain to grant a permission of usage of the maintenance equipment to the first user client terminal according to the transaction request; wherein the usage smart contract comprises a usage agreement, a charging rule and a transaction sharing rule of the maintenance equipment;

call the usage smart contract from the block chain node device to send a payment transaction request to the first user client terminal according to the transaction information, when the maintenance equipment is no longer used by the first user;

perform a sharing according to the transaction sharing rule when the payment transaction is finished by the first user client terminal; and send the transaction information to the block chain node device, so that the block chain node device registers the transaction information in the block chain;

wherein after the payment transaction performed on the first user client terminal is finished, the processor is further configured to detect whether the maintenance equipment is located within a preset range of the location before the maintenance equipment is used, and send out a prompt message to the first user when detecting that the maintenance equipment is not located within the preset range of the location.

7. The data management server according to claim 6, wherein when executing the computer program, the processor is further configured to:

receive the usage agreement of the maintenance equipment submitted by a second user and send the usage agreement of the maintenance equipment to the block chain node device before the transaction request of using the maintenance equipment is received from the first user, so that the block chain node device generates the usage smart contract according to the usage agreement, store and authenticate the usage smart contract, and broadcasts the usage smart agreement to other block chain node devices in the block chain.

8. The data management server according to claim 6, wherein when executing the computer program, the processor is further configured to:

receive maintenance equipment information and investment cost information of the maintenance equipment submitted by the second user before the transaction request of using the maintenance equipment is received from the first user client terminal, store the maintenance equipment information and the investment cost information, generate digital asset information and send the digital asset information to the block chain node device to be registered.

9. The data management server according to claim 6, wherein when executing the computer program, the processor is further configured to:

calculate return on investment of the second user according to the transaction information and the investment cost information after the transaction information is sent to the block chain node device, and send return on investment of the second user to the block chain node device.

10. The data management server according to claim 9, wherein when executing the computer program, the processor is further configured to:

receive a financing agreement submitted by the second user client terminal, and send the financing agreement to the block chain node device, so that the block chain node device generates a financing smart contract according to the financing agreement; wherein the financing smart contract comprises a financing rule and a financing income sharing rule;

receive financing amount information submitted by a third user client terminal; and call the financing smart contract to calculate return on investment of the third user according to the financing amount information and send return on investment of the third user to the third user client terminal.

\* \* \* \* \*